US009815922B2

(12) United States Patent
Hashimoto (10) Patent No.: US 9,815,922 B2
(45) Date of Patent: Nov. 14, 2017

(54) METHOD FOR PRODUCING END-MODIFIED POLYBUTADIENE OR END-MODIFIED HYDROGENATED POLYBUTADIENE AND COMPOSITION CONTAINING SAME

(71) Applicant: NIPPON SODA CO., LTD., Tokyo (JP)

(72) Inventor: Hiroki Hashimoto, Toride (JP)

(73) Assignee: NIPPON SODA CO., LTD., Tokyo (JP)

(*) Notice: Subject to any disclaimer, the term of this patent is extended or adjusted under 35 U.S.C. 154(b) by 0 days.

(21) Appl. No.: 14/430,617

(22) PCT Filed: Oct. 11, 2013

(86) PCT No.: PCT/JP2013/006097
§ 371 (c)(1),
(2) Date: Mar. 24, 2015

(87) PCT Pub. No.: WO2014/061251
PCT Pub. Date: Apr. 24, 2014

(65) Prior Publication Data
US 2015/0240009 A1 Aug. 27, 2015

(30) Foreign Application Priority Data
Oct. 16, 2012 (JP) .................. 2012-228989

(51) Int. Cl.
*C08F 8/14* (2006.01)
*C08F 8/30* (2006.01)
(Continued)

(52) U.S. Cl.
CPC ............ *C08F 136/06* (2013.01); *B01J 31/04* (2013.01); *B01J 31/223* (2013.01); *C08C 19/02* (2013.01);
(Continued)

(58) Field of Classification Search
CPC ...................................... C08F 8/14; C08F 8/30
See application file for complete search history.

(56) References Cited

U.S. PATENT DOCUMENTS

| 4,403,073 A * | 9/1983 | Ikeguchi ............ C08C 19/00 525/167 |
| 8,822,600 B2 * | 9/2014 | Hashimoto ......... C08C 19/28 525/126 |

(Continued)

FOREIGN PATENT DOCUMENTS

| EP | 0 289 852 A1 | 11/1988 |
| JP | S61123650 A | 6/1986 |

(Continued)

OTHER PUBLICATIONS

Nippon Soda (Nisso-PB Liquid Polybutadiene. Nippon Soda., Ltd. 2016, 6 pages).*

(Continued)

*Primary Examiner* — Brieann R Johnston
(74) *Attorney, Agent, or Firm* — Oliff PLC

(57) ABSTRACT

It is an object of the present invention to provide a method for producing a terminal-modified polybutadiene or terminal-modified hydrogenated polybutadiene that does not become colored or white and turbid, without using an organotin compound. The production method of the present invention includes reacting an acrylate or methacrylate represented by formula (I), a diisocyanate compound represented by formula (II), and a polybutadiene or hydrogenated polybutadiene having a hydroxyl group at a polymer terminal, represented by formula (III), in the presence of at least one selected from an organoaluminum compound and an organozinc compound (with the proviso that zinc naphthenate is excluded).

(Continued)

US 9,815,922 B2
Page 2

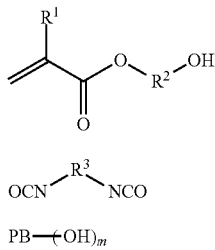

(I)

(II)

(III)

2 Claims, 2 Drawing Sheets (51) Int. Cl.

| | |
|---|---|
| C08F 136/06 | (2006.01) |
| C08F 18/14 | (2006.01) |
| C08C 19/22 | (2006.01) |
| C08C 19/28 | (2006.01) |
| C08C 19/38 | (2006.01) |
| C08G 18/62 | (2006.01) |
| C08G 18/22 | (2006.01) |
| C08G 18/75 | (2006.01) |
| C08G 18/76 | (2006.01) |
| C08G 18/81 | (2006.01) |
| C09D 175/16 | (2006.01) |
| B01J 31/04 | (2006.01) |
| B01J 31/22 | (2006.01) |
| C08C 19/02 | (2006.01) |
| C08F 299/06 | (2006.01) |

(52) U.S. Cl.
CPC .............. *C08C 19/22* (2013.01); *C08C 19/28* (2013.01); *C08C 19/38* (2013.01); *C08F 8/14* (2013.01); *C08F 8/30* (2013.01); *C08F 18/14* (2013.01); *C08F 299/065* (2013.01); *C08G 18/222* (2013.01); *C08G 18/6208* (2013.01); *C08G 18/755* (2013.01); *C08G 18/7621* (2013.01); *C08G 18/8116* (2013.01); *C09D 175/16* (2013.01); *B01J 2231/40* (2013.01); *B01J 2531/31* (2013.01); *C08G 2190/00* (2013.01)

(56) References Cited

U.S. PATENT DOCUMENTS

| | | | |
|---|---|---|---|
| 2005/0239907 A1* | 10/2005 | Tanegashima | B82Y 30/00 516/78 |
| 2011/0064681 A1 | 3/2011 | Wendel et al. | |
| 2013/0165586 A1 | 6/2013 | Hashimoto | |

FOREIGN PATENT DOCUMENTS

| | | |
|---|---|---|
| JP | H02199184 A | 8/1990 |
| JP | 2002371101 A | 12/2002 |
| JP | 2008222743 A | 9/2008 |
| JP | 2011116965 A | 6/2011 |
| JP | 2011523630 A | 8/2011 |
| JP | 2012072296 A | 4/2012 |
| WO | 2012039124 A1 | 3/2012 |

OTHER PUBLICATIONS

Apr. 21, 2015, International Preliminary Report on Patentability issued in International Application No. PCT/JP2013/006097.
International Search Report issued in International Application No. PCT/JP2013/006097.
May 31, 2016 Extended European Search Report issued in European Application No. 13847339.2.

* cited by examiner

METHOD FOR PRODUCING END-MODIFIED POLYBUTADIENE OR END-MODIFIED HYDROGENATED POLYBUTADIENE AND COMPOSITION CONTAINING SAME

TECHNICAL FIELD

The present invention relates to a method for producing a terminal-modified polybutadiene or terminal-modified hydrogenated polybutadiene. In addition, the present invention relates to a terminal-modified polybutadiene or terminal-modified hydrogenated polybutadiene composition that has no coloration nor white turbidity, has excellent storage stability, and contains substantially no tin compound.

This application claims priority to Japanese Patent Application No. 2012-228989 filed on Oct. 16, 2012, the content of which is incorporated herein.

BACKGROUND ART

Conventionally, a terminal-modified polybutadiene or terminal-modified hydrogenated polybutadiene in which a functional group, such as a hydroxyl group or a carboxyl group, is bonded to a terminal portion of the main chain of a polybutadiene or hydrogenated polybutadiene has been known. The terminal-modified polybutadiene or terminal-modified hydrogenated polybutadiene becomes a resin that has excellent water and moisture resistance, chemical resistance, electrical characteristics (high dielectric strength, low dielectric constant, and arc resistance), and transparency, and exhibits physical properties including high toughness, by curing.

Further, polymer oligomers in which a functional group, such as a hydroxyl group, of a polymer is modified with a polymerizable functional group, such as an acryloyl group or a methacryloyl group, via a urethane bond in order to increase curability with ultraviolet rays or electron beams have been developed, and applications to new uses have been expected.

As a method for producing a terminal-modified polybutadiene or terminal-modified hydrogenated polybutadiene (D), an industrial production method in which an isocyanate compound (A) and a polybutadiene or hydrogenated polybutadiene having a hydroxyl group at a polymer terminal (B) are reacted in the presence of dibutyl tin dilaurate (C) has been known (Patent Document 1).

In addition, Patent Document 2 discloses that by using an organobismuth compound or a tetraalkoxyzirconium compound as a catalyst instead of a dibutyl tin dilaurate catalyst, a composition that is more environmentally friendly and has better storage stability is obtained.

PRIOR ART DOCUMENTS

Patent Documents

Patent Document 1: Japanese Patent Application Publication No. 2002-371101
Patent Document 2: WO 2012/039124

SUMMARY OF THE INVENTION

Object to be Solved by the Invention

In the production method described in Patent Document 1, the isocyanate compound (A) and the polybutadiene or hydrogenated polybutadiene having a hydroxyl group at a polymer terminal (B) are reacted using the dibutyl tin dilaurate (C) catalyst. Subsequently, the obtained product is generally used for a subsequent use without purification.

In recent years, the regulation of the use of organotin compounds has been strengthened. Also in the production of polybutadiene, the development of a production method using no organotin compound has been desired.

But, a problem has been that when a reaction is performed without using dibutyl tin dilaurate, the time until the completion of the reaction is long, and further, coloration or white turbidity is caused in the product. Therefore, a production method that provides catalytic activity equal to or more than that of a tin catalyst and causes no coloration nor white turbidity in the product has been required.

Means to Solve the Object

As a result of diligent studies, the present inventors have found a method for producing a terminal-modified polybutadiene or terminal-modified hydrogenated polybutadiene without using an organotin compound, by using an organoaluminum compound and an organozinc compound (with the proviso that zinc naphthenate is excluded) as a catalyst for forming a urethane bond, and completed the present invention.

Specifically, the present invention relates to:
(1) a method for producing a terminal-modified polybutadiene or terminal-modified hydrogenated polybutadiene represented by formula (IV):

(wherein R¹ represents a hydrogen atom or a methyl group, R² represents a C1 to C10 alkylene group having a straight chain or a branched chain, a C3 to C8 cycloalkylene group optionally having a C1 to C6 alkyl group as a substituent, or a combined group thereof, R³ represents a C1 to C10 alkylene group having a straight chain or a branched chain; a C3 to C8 cycloalkylene group optionally having a C1 to C6 alkyl group as a substituent; an arylene group optionally having a halogen atom, a C1 to C6 alkyl group, or a C1 to C6 alkoxy group as a substituent; a heteroarylene group optionally having a halogen atom, a C1 to C6 alkyl group, or a C1 to C6 alkoxy group as a substituent; or a combined group thereof, m represents 1 or 2 and PB represents a polymer chain obtained by polymerizing butadiene, or a polymer chain obtained by hydrogenating the polymer chain), comprising reacting an acrylate or methacrylate represented by formula (I):

(wherein R¹ and R² represent the same meaning as described above), a diisocyanate compound represented by formula (II):

(wherein R³ represents the same meaning as described above), and a polybutadiene or hydrogenated polybutadiene having a hydroxyl group at a polymer terminal, represented by formula (III):

PB­(—OH)$_m$ (III)

(wherein PB and m represent the same meaning as described above), in the presence of at least one selected from an organoaluminum compound and an organozinc compound (with the proviso that zinc naphthenate is excluded);
(2) a method for producing a terminal-modified polybutadiene or terminal-modified hydrogenated polybutadiene represented by formula (IV):

(wherein R¹ represents a hydrogen atom or a methyl group, R² represents a C1 to C10 alkylene group having a straight chain or a branched chain, a C3 to C8 cycloalkylene group optionally having a C1 to C6 alkyl group as a substituent, or a combined group thereof, R³ represents a C1 to C10 alkylene group having a straight chain or a branched chain; a C3 to C8 cycloalkylene group optionally having a C1 to C6 alkyl group as a substituent; an arylene group optionally having a halogen atom, a C1 to C6 alkyl group, or a C1 to C6 alkoxy group as a substituent; a heteroarylene group optionally having a halogen atom, a C1 to C6 alkyl group, or a C1 to C6 alkoxy group as a substituent; or a combined group thereof, m represents 1 or 2, and PB represents a polymer chain obtained by polymerizing butadiene, or a polymer chain obtained by hydrogenating the polymer chain), comprising reacting an isocyanate compound represented by formula (V):

(wherein R¹, R² and R³ represent the same meaning as described above), and a polybutadiene or hydrogenated polybutadiene having a hydroxyl group at a polymer terminal, represented by formula (III):

PB­(—OH)$_m$ (III)

(wherein PB and m represent the same meaning as described above), in the presence of at least one selected from an organoaluminum compound and an organozinc compound (with the proviso that zinc naphthenate is excluded);
(3) the production method according to (1) or (2), wherein the organoaluminum compound is a compound represented by formula (VI):

(wherein R¹¹, R¹², R¹³, and R¹⁴ each independently represent a C1 to C30 alkyl group having a straight chain or a branched chain); and
(4) the production method according to (1) or (2), wherein the organozinc compound is a compound represented by formula (VII):

(wherein each R²¹ represents a C1 to C30 alkyl group having a straight chain or a branched chain, and is the same or different.)

In addition, the present invention relates to:
(5) a terminal acrylic-modified polybutadiene or terminal acrylic-modified hydrogenated polybutadiene composition containing a terminal acrylic-modified polybutadiene or terminal acrylic-modified hydrogenated polybutadiene represented by formula (IV):

(wherein R represents a hydrogen atom or a methyl group, $R^2$ represents a C1 to C10 alkylene group having a straight chain or a branched chain, a C3 to C8 cycloalkylene group optionally having a C1 to C6 alkyl group as a substituent, or a combined group thereof, $R^3$ represents a C1 to C10 alkylene group having a straight chain or a branched chain; a C3 to C8 cycloalkylene group optionally having a C1 to C6 alkyl group as a substituent; an arylene group optionally having a halogen atom, a C1 to C6 alkyl group, or a C1 to C6 alkoxy group as a substituent; a heteroarylene group optionally having a halogen atom, a C1 to C6 alkyl group, or a C1 to C6 alkoxy group as a substituent; or a combined group thereof, PB represents a polymer chain obtained by polymerizing butadiene, or a polymer chain obtained by hydrogenating the polymer chain, and m represents 1 or 2), and at least one selected from an organoaluminum compound and an organozinc compound (with the proviso that zinc naphthenate is excluded); and
(6) the terminal-modified polybutadiene or terminal-modified hydrogenated polybutadiene composition according to (5), wherein the at least one selected from an organoaluminum compound and an organozinc compound (with the proviso that zinc naphthenate is excluded) is contained in an amount of 0.001 parts by weight to 10 parts by weight with respect to 100 parts by weight of the terminal acrylic-modified polybutadiene or terminal acrylic-modified hydrogenated polybutadiene represented by formula (IV).

Effect of the Invention

With the method for producing the polymer according to the present invention, a terminal-modified polybutadiene or terminal-modified hydrogenated polybutadiene can be produced without using an organotin compound.

The product obtained by the production method of the present invention (a mixture of a terminal-modified polybutadiene or terminal-modified hydrogenated polybutadiene and an organoaluminum compound and an organozinc compound (with the proviso that zinc naphthenate is excluded)) had no coloration nor white turbidity.

Further, in a product produced using an organotin compound, the viscosity increases with the lapse of time, whereas the product obtained by the production method of the present invention undergoes small changes in viscosity over time, and has excellent storage stability.

MODE OF CARRYING OUT THE INVENTION

In the present invention, the definitions of substituents are as follows.

Examples of "a C1 to C10 alkylene group having a straight chain or a branched chain" in $R^2$ and $R^3$ include a methylene group, an ethylene group, a propylene group, a methylethylene group, a butylene group, a 1,2-dimethylethylene group, a pentylene group, a 1-methylbutylene group, a 2-methylbutylene group, and a hexylene group.

Examples of "a C1 to C6 alkyl group" in "a C3 to C8 cycloalkylene group optionally having a C1 to C6 alkyl group as a substituent" in $R^2$ and $R^3$ can include a methyl group, an ethyl group, a n-propyl group, an isopropyl group, a n-butyl group, a 1-methyl-n-propyl group, a 2-methyl-n-propyl group, a t-butyl group, a n-pentyl group, a 1-methyl-n-butyl group, a 2-methyl-n-butyl group, a 3-methyl-n-butyl group, a 1,1-dimethyl-n-propyl group, a 2,2-dimethyl-n-propyl group, a 1,2-dimethyl-n-propyl group, a 1-ethyl-n-propyl group, a n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 2,2-dimethyl-n-butyl group, a 3,3-dimethyl-n-butyl group, a 1,2-dimethyl-n-butyl group, a 1,3-dimethyl-n-butyl group, a 2,3-dimethyl-n-butyl group, a 1-ethyl-n-butyl group, a 2-ethyl-n-butyl group, and a 1-isopropyl-n-propyl group.

Examples of "a C3 to C8 cycloalkylene group optionally having a C1 to C6 alkyl group as a substituent" in $R^2$ and $R^3$ include cyclopropylene, 2-methylcyclopropylene, cyclobutylene, 2,2-dimethylcyclobutylene, cyclopentylene, 2,3-dimethylcyclopentylene, cyclohexylene, 1,3,3,-trimethylcyclohexylene, and cyclooctylene.

Examples of "a halogen atom" in "optionally having a halogen atom, a C1 to C6 alkyl group, or a C1 to C6 alkoxy group as a substituent" in $R^3$ include a chlorine atom, a bromine atom, and a fluorine atom.

Examples of "a C1 to C6 alkyl group" in "optionally having a halogen atom, a C1 to C6 alkyl group, or a C1 to C6 alkoxy group as a substituent" can include groups similar to "a C1 to C6 alkyl group" in "a C3 to C8 cycloalkylene group optionally having a C1 to C6 alkyl group as a substituent" described above.

Examples of "a C1 to C6 alkoxy group" in "optionally having a halogen atom, a C1 to C6 alkyl group, or a C1 to C6 alkoxy group as a substituent" can include a methoxy group, an ethoxy group, a n-propoxy group, an isopropoxy group, a n-butoxy group, a 1-methyl-n-propoxy group, a 2-methyl-n-propoxy group, a t-butoxy group, a n-pentyloxy group, a 1-methyl-n-butoxy group, a 2-methyl-n-butoxy group, a 3-methyl-n-butoxy group, a 1,1-dimethyl-n-propoxy group, a 2,2-dimethyl-n-propoxy group, a 1,2-dimethyl-n-propoxy group, a 1-ethyl-n-propoxy group, a n-hexyloxy group, a 1-methyl-n-pentyloxy group, a 2-methyl-n-pentyloxy group, a 3-methyl-n-pentyloxy group, a 4-methyl-n-pentyloxy group, a 1,1-dimethyl-n-butoxy group, a 2,2-dimethyl-n-butoxy group, a 3,3-dimethyl-n- butoxy group, a 1,2-dimethyl-n-butoxy group, a 1,3-dimethyl-n-butoxy group, a 2,3-dimethyl-n-butoxy group, a 1-ethyl-n-butoxy group, a 2-ethyl-n-butoxy group, and a 1-isopropyl-n-propoxy group.

Examples of "an arylene group optionally having a halogen atom, a C1 to C6 alkyl group, or a C1 to C6 alkoxy group as a substituent" in $R^3$ include a 1,2-phenylene group, a 1,3-phenylene group, a 1,4-phenylene group, a 3-methyl-1,2-phenylene group, a 4-methyl-1,2-phenylene group, a 5-methyl-1,2-phenylene group, a 2-methyl-1,3-phenylene group, a 4-methyl-1,3-phenylene group, a 5-methyl-1,3-phenylene group, a 2-methyl-1,4-phenylene group, a 3-methyl-1,4-phenylene group, a 3,4-dimethyl-1,2-phenylene group, a 4,5-dimethyl-1,3-phenylene group, a 2,5-dimethyl-1,4-phenylene group, a 2,3-dimethyl-1,4-phenylene group, a 3-ethyl-1,2-phenylene group, a 4-ethyl-1,2-phenylene group, a 2-ethyl-1,3-phenylene group, a 4-ethyl 1,3-phenylene group, a 5-ethyl-1,3-phenylene group, a 2-ethyl-1,4-phenylene group, a 3-ethyl-1,4-phenylene group, a 3-methoxy-1,2-phenylene group, a 4-methoxy-1,2-phenylene group, a 5-methoxy-1,2-phenylene group, a 2-methoxy-1,3-phenylene group, a 4-methoxy-1,3-phenylene group, a 5-methoxy-1,3-phenylene group, a 2-methoxy-1,4-phenylene group, a 3-methoxy-1,4-phenylene group, a 3-chloro-1,2-phenylene group, a 4-chloro-1,2-phenylene group, a 2-chloro-1,3-phenylene group, a 4-chloro-1,3-phenylene group, a 5-chloro-1,3-phenylene group, a 2-chloro-1,4-phenylene group, a 3-chloro-1,4-phenylene group, a 3-fluoro-1,2-phenylene group, a 4-fluoro-1,2-phenylene group, a 2-fluoro-1,3-phenylene group, a 4-fluoro-1,3-phenylene group, a 5-fluoro-1,3-phenylene group, a 2-fluoro-1,4-phenylene group, a 3-fluoro-1,4-phenylene group, a 3-bromo-1,2-phenylene group, a 4-bromo-1,2-phenylene group, a 2-bromo-1,3-phenylene group, a 4-bromo-1,3-phenylene group, a 5-bromo-1,3-phenylene group, a 2-bromo-1,4-phenylene group, a 3-bromo-1,4-phenylene group, a 3-chloro-4-methyl-1,2-phenylene group, a 3-methyl-4-chloro-1,2-phenylene group, a 3-methyl-5-chloro-1,2-phenylene group, a 2-chloro-4-methyl-1,3-phenylene group, a 4-chloro-5-methoxy-1,3-phenylene group, a 5-chloro-2-fluoro-1,3-phenylene group, a 2-chloro-3-bromo-1,4-phenylene group, a 3-chloro-5-isopropoxy-1,4-phenylene group, a 1,2-naphthalenediyl group, a 1,3-naphthalenediyl group, a 1,4-naphthalenediyl group, and a 2,6-naphthalenediyl group.

Examples of "a heteroarylene group optionally having a halogen atom, a C1 to C6 alkyl group, or a C1 to C6 alkoxy group as a substituent" in $R^3$ include a pyridine-2,3-diyl group, a pyridine-2,4-diyl group, a pyridine-2,5-diyl group, a pyridine-2,6-diyl group, a 6-chloropyridine-2,4-diyl group, a 6-methylpyridine-2,4-diyl group, a 6-methoxypyridine-2,4-diyl group, a 3-methylpyridine-2,5-diyl group, a 4-methylpyridine-2,5-diyl group, a 3-methylpyridine-2,6-diyl group, a 4-methylpyridine-2,6-diyl group, a pyrimidine-2,4-diyl group, and a pyrimidine-2,5-diyl group.

"A combined group thereof" in $R^2$ means "a group in which a C1 to C10 alkylene group having a straight chain or a branched chain is bonded to a C3 to C8 cycloalkylene group optionally having a C1 to C6 alkyl group as a substituent."

"A combined group thereof" in $R^3$ means
"a group in which a C1 to C10 alkylene group having a straight chain or a branched chain is bonded to a C3 to C8 cycloalkylene group optionally having a C1 to C6 alkyl group as a substituent,"
"a group in which a C1 to C10 alkylene group having a straight chain or a branched chain is bonded to an arylene group optionally having a halogen atom, a C1 to C6 alkyl group, or a C1 to C6 alkoxy group as a substituent," or
"a group in which a C1 to C10 alkylene group having a straight chain or a branched chain is bonded to a heteroarylene group optionally having a halogen atom, a C1 to C6 alkyl group, or a C1 to C6 alkoxy group as a substituent."

Examples of "a group in which a C1 to C10 alkylene group having a straight chain or a branched chain is bonded to a C3 to C8 cycloalkylene group optionally having a C1 to C6 alkyl group as a substituent" include a methylene group and a cyclopropylene group, a methylene group and a cyclopentylene group, a methylene group and a 2,3-dimethylcyclopentylene group, a methylene group and a 1,3,3-trimethylcyclohexylene group, an ethylene group and a cyclopropylene group, an ethylene group and a cyclohexylene group, an ethylene group and a 3,3-dimethylcyclohexylene group, a methylene group, a cyclopropylene group and a methylene group, an ethylene group, a cyclohexylene group and a methylene group, and a hexylene group, a cyclohexylene group and a methylene group. In addition, groups in which the order of these is changed can be included.

Examples of "a group in which a C1 to C10 alkylene group having a straight chain or a branched chain is bonded to an arylene group optionally having a halogen atom, a C1 to C6 alkyl group, or a C1 to C6 alkoxy group as a substituent" include a methylene group and a 1,2-phenylene group, a methylene group and a 1,2-naphthalenediyl group, and an ethylene group and a 1,1'-biphenyl-2,2'-diyl group. In addition, groups in which the order of these is changed can be included.

Examples of "a group in which a C1 to C10 alkylene group having a straight chain or a branched chain is bonded to a heteroarylene group optionally having a halogen atom, a C1 to C6 alkyl group, or a C1 to C6 alkoxy group as a substituent" include a methylene group and a pyridine-2,3-diyl group, a methylene group and a pyrazine-2,5-diyl group, and a methylene group and a pyrimidine-2,4-diyl group. In addition, groups in which the order of these is changed can be included.

Examples of "a C1 to C30 alkyl group having a straight chain or a branched chain" in $R^{11}$, $R^{12}$, $R^{13}$, $R^{14}$, and $R^{21}$ include a methyl group, an ethyl group, a n-propyl group, an isopropyl group, a n-butyl group, a sec-butyl group, a t-butyl group, a n-pentyl group, an isopentyl group, a neopentyl group, a t-pentyl group, a 1-methylpentyl group, a 2-methylpentyl group, a n-hexyl group, an isohexyl group, a heptyl group, a 6,6-dimethylheptyl group, a 1,1-dimethylheptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group.

(Terminal-Modified Polybutadiene or Terminal-Modified Hydrogenated Polybutadiene)

The terminal-modified polybutadiene or terminal-modified hydrogenated polybutadiene of the present invention refers to one represented by the following formula (IV).

In the above formula, $R^1$ represents a hydrogen atom or a methyl group, $R^2$ represents a C1 to C10 alkylene group having a straight chain or a branched chain, a C3 to C8 cycloalkylene group optionally having a C1 to C6 alkyl group as a substituent, or a combined group thereof, $R^3$ represents a C1 to C10 alkylene group having a straight chain or a branched chain; a C3 to C8 cycloalkylene group optionally having a C1 to C6 alkyl group as a substituent; an arylene group optionally having a halogen atom, a C1 to C6 alkyl group, or a C1 to C6 alkoxy group as a substituent; a heteroarylene group optionally having a halogen atom, a C1 to C6 alkyl group, or a C1 to C6 alkoxy group as a substituent; or a combined group thereof, PB represents a polymer chain obtained by polymerizing butadiene, or a polymer chain obtained by hydrogenating the polymer chain, and m represents 1 or 2.

In formula (IV), the polymer chain obtained by polymerizing butadiene, or the polymer chain obtained by hydrogenating the polymer chain, represented by PB, has a repeating unit of a 1,4-bond represented by formula (VIII):

(VIII)

(wherein the double line portion of the solid line and the dotted line represents a single bond or a double bond, and the wavy line represents either a cis form or a trans form in the case of a double bond), and a repeating unit of a 1,2-bond represented by formula (IX):

(IX)

(wherein the double line portion of the solid line and the dotted line represents a single bond or a double bond), as a skeleton.

A case where the double line portion of the solid line and the dotted line is a double bond is an unhydrogenated polybutadiene, and a case where the double line portion of the solid line and the dotted line is a single bond means a hydrogenated polybutadiene. In the case of hydrogenated polybutadiene, it is not necessary that 100% of double bond parts are hydrogenated, and the remaining rate of double bond parts is not particularly limited.

In addition, when the 1,4-bond repeating unit represented by formula (VIII) has a double bond, a trans form, a cis form, or a mixture thereof can be present.

The ratio of the repeating unit of the 1,4-bond represented by formula (VIII), and the ratio of the 1,2-bond represented by formula (IX) are each 0 to 100 mole %. In other words, in the present invention, the polymer chain represented by PB can be a polymer of only 1,4-bonds or 1,2-bonds, or a polymer in which 1,4-bonds and 1,2-bonds are mixed.

The terminal acrylic-modified polybutadiene or terminal acrylic-modified hydrogenated polybutadiene of the present invention has a number average molecular weight of 500 to 10,000 according to a GPC (gel filtration) method using polystyrene as an indicator.

(Production Method)

The terminal-modified polybutadiene or terminal-modified hydrogenated polybutadiene of the present invention can be produced according to the method shown below.

The terminal-modified polybutadiene or terminal-modified hydrogenated polybutadiene of the present invention can be produced by reacting an acrylate or methacrylate represented by formula (I):

(I)

(wherein $R^1$ represents a hydrogen atom or a methyl group, and $R^2$ represents a C1 to C10 alkylene group having a straight chain or a branched chain, a C3 to C8 cycloalkylene group optionally having a C1 to C6 alkyl group as a substituent, or a combined group thereof), a diisocyanate compound represented by formula (II):

(II)

(wherein $R^3$ represents a C1 to C10 alkylene group having a straight chain or a branched chain; a C3 to C8 cycloalkylene group optionally having a C1 to C6 alkyl group as a substituent; an arylene group optionally having a halogen atom, a C1 to C6 alkyl group, or a C1 to C6 alkoxy group as a substituent; a heteroarylene group optionally having a halogen atom, a C1 to C6 alkyl group, or a C1 to C6 alkoxy group as a substituent; or a combined group thereof), and a polybutadiene or hydrogenated polybutadiene having a hydroxyl group at a polymer terminal, represented by formula (III):

(III)

(wherein PB represents a polymer chain obtained by polymerizing butadiene, or a polymer chain obtained by hydrogenating the polymer chain, and m represents 1 or 2), as raw materials, in the presence of at least one selected from an organoaluminum compound and an organozinc compound (with the proviso that zinc naphthenate is excluded).

For the production procedure, it is possible to substantially simultaneously react the acrylate or methacrylate represented by the above formula (I), the diisocyanate represented by the above formula (II), and the polybutadiene or hydrogenated polybutadiene having a hydroxyl group at a polymer terminal, represented by the above formula (III), or it is possible to react the acrylate or methacrylate represented by the above formula (I) and the diisocyanate represented by the above formula (II) to obtain an isocyanate compound represented by the following formula (V) and then react a polybutadiene or hydrogenated polybutadiene having a hydroxyl group at a polymer terminal, represented by the following formula (III). The latter is preferred.

In addition, the terminal-modified polybutadiene or terminal-modified hydrogenated polybutadiene of the present invention can also be produced by reacting an isocyanate compound represented by formula (V):

(wherein $R^1$ represents a hydrogen atom or a methyl group, $R^2$ represents a C1 to C10 alkylene group having a straight chain or a branched chain, a C3 to C8 cycloalkylene group optionally having a C1 to C6 alkyl group as a substituent, or a combined group thereof, and $R^3$ represents a C1 to C10 alkylene group having a straight chain or a branched chain; a C3 to C8 cycloalkylene group optionally having a C1 to C6 alkyl group as a substituent; an arylene group optionally having a halogen atom, a C1 to C6 alkyl group, or a C1 to C6 alkoxy group as a substituent; a heteroarylene group optionally having a halogen atom, a C1 to C6 alkyl group, or a C1 to C6 alkoxy group as a substituent; or a combined group thereof), and a polybutadiene or hydrogenated polybutadiene having a hydroxyl group at a polymer terminal, represented by formula (III):

(wherein PB represents a polymer chain obtained by polymerizing butadiene, or a polymer chain obtained by hydrogenating the polymer chain, and m represents 1 or 2), in the presence of at least one selected from an organoaluminum compound and an organozinc compound (with the proviso that zinc naphthenate is excluded).

Examples of the acrylate or methacrylate represented by formula (I) include hydroxymethyl(meth)acrylate, 2-hydroxyethyl(meth)acrylate, 3-hydroxy-n-propyl(meth)acrylate, 2-hydroxy-n-propyl(meth)acrylate, 2-hydroxyisopropyl(meth)acrylate, 2-hydroxy-n-butyl(meth)acrylate, 3-hydroxy-n-butyl(meth)acrylate, 5-hydroxy-n-pentyl(meth)acrylate, 2-hydroxy-n-pentyl(meth)acrylate, 3-hydroxy-n-pentyl(meth)acrylate, 4-hydroxy-n-pentyl(meth)acrylate, 2-hydroxycyclopropyl(meth)acrylate, 3-hydroxycyclopentyl(meth)acrylate, and 4-hydroxycyclohexyl(meth)acrylate.

In the above illustration, (meth)acrylate means acrylate or methacrylate. The same applies hereinafter.

The amount of the above acrylate and methacrylate compounds used is in the range of 0.2 to 2 times moles with respect to the hydroxyl group of the polybutadiene or hydrogenated polybutadiene having a hydroxyl group at a polymer terminal.

Among diisocyanate compounds represented by formula (II), examples of aliphatic diisocyanate compounds include methyl diisocyanate, 1,2-ethanediyl diisocyanate, 1,3-propanediyl diisocyanate, 1,6-hexanediyl diisocyanate, 3-methyl-octane-1,8-diyl diisocyanate, 1,2-cyclopropanediyl diisocyanate, 1,3-cyclobutanediyl diisocyanate, 1,4-cyclohexanediyl diisocyanate, 1,3-cyclohexanediyl diisocyanate, isophorone diisocyanate, 4-methyl-cyclohexane-1,3-diyl-diisocyanate, 4,4-methylenebis(cyclohexyl isocyanate), 1,3-bis(2-isocyanate-2-propyl)benzene, 1,4-bis(2-isocyanate-2-propyl)benzene, 2,6-diisocyanatehexanoic acid, 1,3-bis(5-isocyanate-1,3,3-trimethylcyclohexyl)-5-((trimethylsilyl)imino)-2,4-imidazolidinedione, acetamide, N-(1,3-bis(5-isocyanate-1,3,3-trimethylcyclohexyl)-2,5-(dioxo-imidazolidin-4-ylidene))acetamide, 2-propenamide, N-(1,3-bis(5-isocyanate-1,3,3-trimethylcyclohexyl)-2,5-(dioxo-imidazolidin-4-ylidene))-2-methyl-2-propenamide, 2,6-diisocyanatehexanoic acid, trans-1,4-cyclohexane diisocyanate, hexamethylene diisocyanate, 1,3-bis(isocyanatemethyl)benzene, 1,12-diisocyanatedodecane, trimethylhexamethylene diisocyanate, 1,4-diisocyanatebutane, 1,3-bis(isocyanatemethyl)cyclohexane, 1,8-diisocyanateoctane, trimethyl-1,6-diisocyanatehexane, 1-(2-heptyl-6-(9-isocyanatenonyl)-3-pentyl-cyclohexyl)-9-isocyanate-nonane, 1,4-bis(isocyanatemethyl)cyclohexane, 1,2-bis(isocyanatemethyl)benzene, ethyl ester L-lysine diisocyanate, and methyl ester L-lysine diisocyanate. Non-yellowing diisocyanates are preferred.

Among diisocyanate compounds represented by formula (II), examples of diisocyanate compounds comprising an arylene group can include 1,2-phenylene diisocyanate, 1,3-phenylene diisocyanate, 1,4-phenylene diisocyanate, 3-chloro-1,2-benzene diisocyanate, 4-chloro-1,2-benzene diisocyanate, 5-chloro-1,2-benzene diisocyanate, 2-chloro-1,3-benzene diisocyanate, 4-chloro-1,3-benzene diisocyanate, 5-chloro-1,3-benzene diisocyanate, 2-chloro-1,4-benzene diisocyanate, 3-chloro-1,4-benzene diisocyanate, 3-methyl-1,2-benzene diisocyanate, 4-methyl-2-benzene diisocyanate, 5-methyl-1,2-benzene diisocyanate, 2-methyl-1,3-benzene diisocyanate, 4-methyl-1,3-benzene diisocyanate, 5-methyl-1,3-benzene diisocyanate, 2-methyl-1,4-benzene diisocyanate, 3-methyl-1,4-benzene diisocyanate, 3-methoxy-1,2-benzene diisocyanate, 4-methoxy-1,2-benzene diisocyanate, 5-methoxy-1,2-benzene diisocyanate, 2-methoxy-1,3-benzene diisocyanate, 4-methoxy-1,3-benzene diisocyanate, 5-methoxy-1,3-benzene diisocyanate, 2-methoxy-1,4-benzene diisocyanate, 3-methoxy-1,4-benzene diisocyanate, 3,4-dimethyl-1,2-benzene diisocyanate, 4,5-dimethyl-1,3-benzene diisocyanate, 2,3-dimethyl-1,4-benzene diisocyanate, 3-chloro-4-methyl-1,2-benzene diisocyanate, 3-methyl-4-chloro-1,2-benzene diisocyanate, 3-methyl-5-chloro-1,2-benzene diisocyanate, 2-chloro-4-methyl-1,3-benzene diisocyanate, 4-chloro-5-methoxy-1,3-benzene diisocyanate, 5-chloro-2-fluoro-1,3-benzene diisocyanate, 2-chloro-3-bromo-1,4-benzene diisocyanate, and 3-chloro-5-isopropoxy-1,4-benzene diisocyanate.

Among diisocyanate compounds represented by formula (II), examples of diisocyanate compounds comprising a heteroarylene group can include 2,3-diisocyanatepyridine, 2,4-diisocyanatepyridine, 2,5-diisocyanatepyridine, 2,6-diisocyanatepyridine, 2,5-diisocyanate-3-methylpyridine, 2,5-diisocyanate-4-methylpyridine, and 2,5-diisocyanate-6-methylpyridine.

The amount of the diisocyanate compound represented by formula (II) is in the range of 0.2 to 2 times moles with respect to the hydroxyl group of the polybutadiene or hydrogenated polybutadiene having a hydroxyl group at a polymer terminal.

The polybutadiene or hydrogenated polybutadiene having a hydroxyl group at a polymer terminal, represented by formula (III), has the repeating units represented by the above formula (XI) and/or formula (XII), and all or part of the polymer terminals are modified with a hydroxyl group.

As the polybutadiene or hydrogenated polybutadiene having a hydroxyl group at a polymer terminal, commercial ones can be used. Examples thereof can include Nisso-PB-G-1000 (manufactured by Nippon Soda Co., Ltd.), Nisso-PB-G-2000 (manufactured by Nippon Soda Co., Ltd.), Nisso-PB-G-3000 (manufactured by Nippon Soda Co., Ltd.), Nisso-PB-GI-1000 (manufactured by Nippon Soda Co., Ltd.), Nisso-PB-GI-2000 (manufactured by Nippon Soda Co., Ltd.), Nisso-PB-GI-3000 (manufactured by Nippon Soda Co., Ltd.), and Poly bd R45HT (manufactured by Idemitsu Kosan Co., Ltd.). One of these can be used alone, or two or more of these can be used in combination.

Examples of methods for producing a polybutadiene include (1) a method of polymerizing butadiene in a solution with a Ziegler catalyst, a lithium catalyst, or a radical polymerization initiator, and (2) a method of polymerizing butadiene in a solution in the presence of a sodium catalyst. Examples of methods for producing a hydrogenated polybutadiene include a method of hydrogenating a polymer having a repeating unit, obtained by the above (1) or (2). According to the method (1), a product in which butadiene is mainly polymerized by a 1,4-bond can be obtained. According to the method (2), a product in which butadiene is mainly polymerized by a 1,2-bond can be obtained.

Examples of methods for introducing a hydroxyl group into a polymer terminal of a polybutadiene or hydrogenated polybutadiene include a method of adding an epoxy compound to a reaction liquid obtained by polymerizing butadiene. Examples of epoxy compounds that can be used here include ethylene oxide and propylene oxide.

The organoaluminum compound is a compound in which an organic group is bonded to an aluminum atom. The bonded group is not particularly limited as long as it does not adversely affect the reaction. A preferred organoaluminum compound of the present invention is an aluminum alkoxide, and is, for example, a compound represented by formula (VI):

(wherein $R^{11}$, $R^{12}$, $R^{13}$, and $R^{14}$ each independently represent a C1 to C30 alkyl group having a straight chain or a branched chain.) Among these, from the viewpoint that the obtained product (a mixture of a terminal-modified polybutadiene or terminal-modified hydrogenated polybutadiene and an organoaluminum compound and a zinc acyclic aliphatic carboxylate) is less likely to have coloration or white turbidity, $R^{11,12}$ each preferably represent a C1 to C6 alkyl group having a straight chain or a branched chain, $R^{14}$ preferably represents a C1 to C3 alkyl group having a straight chain or a branched chain, and $R^{13}$ preferably represents a C10 to C30 alkyl group having a straight chain or a branched chain.

Specific examples of the organoaluminum compound represented by formula (VI) can include compounds shown in Table 1.

TABLE 1

TABLE 1-continued

TABLE 1-continued

The organozinc compound is not particularly limited as long as it is one other than zinc naphthenate, and the organozinc compound is preferably a zinc acyclic aliphatic carboxylate. The organozinc compound is, for example, a compound represented by formula (VII):

(VII)

(wherein each $R^{21}$ represents a C1 to C30 alkyl group having a straight chain or a branched chain, and is the same or different.)

Specific examples of the organozinc compound include zinc acetate, zinc acetylacetate, zinc 2-ethylhexanoate, zinc octylate, zinc neodecanoate, zinc laurate, and zinc stearate.

The amount of the above organoaluminum compound or organozinc compound (with the proviso that zinc naphthenate is excluded) used is 0.0001 parts by weight to 50 parts by weight, preferably 0.001 parts by weight to 10 parts by weight, and further preferably 0.01 parts by weight to 10 parts by weight, with respect to 100 parts by weight of the terminal-modified polybutadiene or the terminal-modified hydrogenated polybutadiene.

The reaction of the above raw material compounds is performed without a solvent or in an appropriate inert solvent. The reaction is generally performed without a solvent. Examples of the solvent used in the reaction include an aromatic hydrocarbon, such as benzene, toluene, and xylene; an ester-based solvent, such as methyl acetate, ethyl acetate, and n-propyl acetate; a polymerizable monomer, such as methyl acrylate, ethyl acrylate, methyl methacrylate, ethyl methacrylate, styrene, and propylene; an amide-based solvent, such as N,N-dimethylformamide, N,N-dimethylacetamide, and N-methylpyrrolidone; an ether-based solvent, such as diethyl ether, tetrahydrofuran, 1,2-dimethoxyethane, and 1,4-dioxane; a nitrile-based solvent, such as acetonitrile and benzonitrile; dimethyl sulfoxide; and a phosphoric acid amide-based solvent, such as hexamethylphosphorous triamide (HMPT) and hexamethylphosphoric triamide (HMPA).

The reaction temperature is generally in the range of 0° C. to 100° C., preferably room temperature to 80° C. The reaction is generally completed in several minutes to several hours.

(Terminal-Modified Polybutadiene or Terminal-Modified Hydrogenated Polybutadiene Composition)

In the present invention, "a terminal-modified polybutadiene or terminal-modified hydrogenated polybutadiene composition" means a composition containing a terminal-modified polybutadiene or terminal-modified hydrogenated polybutadiene represented by formula (IV):

(wherein $R^1$, $R^2$, $R^3$, PB, and m are as defined above), and at least one selected from an organoaluminum compound and an organozinc compound (with the proviso that zinc naphthenate is excluded).

An unpurified product obtained by the above production method, itself, can be the composition.

The terminal-modified polybutadiene or terminal-modified hydrogenated polybutadiene composition of the present invention contains 0.0001 parts by weight to 50 parts by weight, preferably 0.001 parts by weight to 10 parts by weight, and further preferably 0.01 parts by weight to 10 parts by weight, of the at least one selected from an organoaluminum compound and an organozinc compound (with the proviso that zinc naphthenate is excluded) with respect to 100 parts by weight of the terminal-modified polybutadiene or terminal-modified hydrogenated polybutadiene represented by formula (IV).

The terminal-modified polybutadiene or terminal-modified hydrogenated polybutadiene composition of the present invention undergoes small changes in viscosity over time, and has excellent storage stability.

(Curable Composition and Cured Product)

The terminal-modified polybutadiene or terminal-modified hydrogenated polybutadiene composition of the present invention can be used as a curable composition by further adding other components.

Such a curable composition can be cured, together with the other components added, by heating, light, a radical polymerization initiator, or the like according to the purpose. Alternatively, the curable composition can also be cured by the Michael addition method.

The method of heating is not particularly limited, and conventionally publicly known heating methods, such as heaters, can be used.

For the light, for example, ultraviolet rays, visible light, X-rays, and electron beams, can be used, and the use of ultraviolet rays is preferred. Ultraviolet rays have high energy, and therefore, by irradiating the curable composition with ultraviolet rays, the curing reaction can be promoted, and the curing speed of the curable composition can be increased, and the amount of the unreacted curable composition in the cured product can be reduced.

The method of visible light irradiation is not particularly limited, and examples thereof include methods using incandescent lamps or fluorescent lamps. The method of ultraviolet irradiation is not particularly limited. Examples of the electrode type can include metal halide lamps, xenon lamps, low pressure mercury lamps, high pressure mercury lamps, and ultrahigh pressure mercury lamps. Examples of the electrodeless type can include excimer lamps and metal halide lamps. When ultraviolet rays are used, their wavelength range is not particularly limited, and is preferably 150 nm to 400 nm, further preferably 200 nm to 380 nm. As the ultraviolet irradiation atmosphere, an inert gas atmosphere, such as nitrogen gas or carbonic acid gas, or an atmosphere in which the oxygen concentration is decreased is preferred. A general air atmosphere is also possible. The irradiation atmosphere temperature can generally be 10 to 200° C.

The cured state can be measured using a Fourier transform infrared spectrometer, a photochemical reaction calorimeter, or the like, and therefore, curing conditions (light irradiation time, light intensity, and the like, or heating temperature, heating time, and the like) for completely curing the cured product can be appropriately selected.

The curing reaction can be performed only with the terminal-modified polybutadiene or terminal-modified hydrogenated polybutadiene of the present invention, and can also be performed by adding a polymerizable vinyl compound.

Examples of the polymerizable vinyl compound include aromatic vinyl compounds, such as styrene, vinyltoluene, α-methylstyrene, and divinylbenzene; unsaturated carboxylates, such as methyl(meth)acrylate, 2-hydroxyethyl(meth)acrylate, t-butyl(meth)acrylate, n-hexyl(meth)acrylate, isobutyl(meth)acrylate, cyclohexyl(meth)acrylate, 2-ethylhexyl(meth)acrylate, lauryl(meth)acrylate, stearyl(meth)acrylate, benzyl(meth)acrylate, a mono or di(meth)acrylate of (poly)ethylene glycol, a mono or di(meth)acrylate of (poly)propylene glycol, a mono- or di-(meth)acrylate of 1,4-butanediol, and a mono-, di-, or tri-(meth)acrylate of trimethylolpropane; allylated products, such as diallyl phthalate, diallylacrylamide, triallyl(iso)cyanurate, triallyl trimellitate, o,o'-diallyl bisphenol A, o,o'-diallyl bisphenol F, 1,1,1,3,3,3-hexafluoro-2,2-bis(p-hydroxy-o-allylphenyl) propane, allylated phenol novolac, 1,1,3-tris-(4-hydroxyphenyl)propane, 1,1,2,2-tetra(4-hydroxyphenyl)ethane, and dehydration condensation products of phenols and hydroxybenzaldehyde; (poly)oxyalkylene glycol di(meth)acrylates, such as (poly)ethylene glycol di(meth)acrylate and (poly)propylene glycol di(meth)acrylate; and a terminal acrylic-modified polybutadiene, such as TEA-1000, TE-1000, and TEAI-1000 (manufactured by Nippon Soda Co., Ltd.). Examples of the polymerizable vinyl compound also include conjugated diene compounds, such as butadiene, isoprene, and chloroprene, and reactive functional group-containing compounds, such as acrylic acid, methacrylic acid, itaconic acid, fumaric acid, glycidyl methacrylate, vinylpyridine, diethylaminoethyl acrylate, N-methylmethacrylamide, and acrylonitrile. One of these polymerizable vinyl compounds can be used alone, or a mixture of two or more of these polymerizable vinyl compounds can be used.

The radical polymerization initiator is a compound that releases a substance that initiates radical polymerization, by light irradiation and/or heating. Examples of the radical polymerization initiator include organic peroxides imidazole derivatives, bisimidazole derivatives, N-arylglycine derivatives, organic azide compounds, titanocenes, aluminate complexes, N-alkoxypyridinium salts, and thioxanthone derivatives. Specific examples of the organic peroxides include hydroperoxides, such as t-butyl hydroperoxide, p-menthane hydroperoxide, cumene hydroperoxide, and diisopropylbenzene hydroperoxide; peroxyesters, such as t-butyl peroxylaurate, t-butyl peroxybenzoate, and t-butyl peroxydecanoate; peroxyketals, such as 1,5-di-t-butylperoxy-3,3,5-trimethylcyclohexane; ketone peroxides, such as ethyl acetoacetate peroxide; and diacyl peroxides, such as benzoyl peroxide; and in addition, benzoin, benzoin isopropyl ether, benzoin isobutyl ether, 2,2-diethoxyacetophenone, 2,2-dimethoxyphenylacetophenone, 2-ethylanthraquinone, 1,3-di(t-butyldioxycarbonyl)benzophenone, 4,4'-tetrakis(t-butyldioxycarbonyl)benzophenone, 3-phenyl-5-isoxazolone, 2-mercaptobenzimidazole, bis(2,4,5-triphenyl)imidazole, 2,2-dimethoxy-1,2-diphenylethan-1-one (the trade name Irgacure 651, manufactured by Ciba Specialty Chemicals), 1-hydroxy-cyclohexyl-phenyl-ketone (the trade name Irgacure 184, manufactured by Ciba Specialty Chemicals), 2-benzyl-2-dimethylamino-1-(4-morpholinophenyl)-butan-1-one (the trade name Irgacure 369, manufactured by Ciba Specialty Chemicals), bis($\eta^5$-2,4-cyclopentadien-1-yl)-bis(2,6-difluoro-3-(1H-pyrrol-1-yl)-phenyl)titanium) (the trade name Irgacure 784, manufactured by Ciba Specialty Chemicals), dicumyl peroxide (DCP), t-butylperbenzoate (TBPB), and t-butylperoxy hexyne-3. One of these radical polymerization initiators can be used alone, or a mixture of two or more of these radical polymerization initiators can be used.

Other components can be added and blended into the terminal-modified polybutadiene or terminal-modified hydrogenated polybutadiene of the present invention in a range in which its characteristics are not impaired, according to the purpose. Examples of these blended components include thermosetting resins, thermoplastic resins, photocurable resins, solvents, coupling agents, fillers, flame retardants, plasticizers, polymerization inhibitors, organopolysiloxanes having a molecular weight of 1000 or more, pigments, fibrous materials, and antistatic agents.

As the thermosetting resins, novolac type phenolic resins, such as phenol novolac resins, cresol novolac resins, and bisphenol A novolac resins, phenolic resins, such as resol phenolic resins, bisphenol type epoxy resins, such as bisphenol A epoxy resins and bisphenol F epoxy resins, novolac type epoxy resins, such as novolac epoxy resins and cresol novolac epoxy resins, epoxy resins, such as biphenyl type epoxy resins, stilbene type epoxy resins, triphenolmethane type epoxy resins, alkyl-modified triphenolmethane type epoxy resins, triazine nucleus-containing epoxy resins, and dicyclopentadiene-modified phenol type epoxy resins, urea resins, resins having a triazine ring, such as melamine resins, unsaturated polyester resins, bismaleimide resins, polyurethane resins, diallyl phthalate resins, silicone resins, resins having a benzoxazine ring, cyanate ester resins, and the like can be used.

As the thermoplastic resins, aromatic or aliphatic petroleum resins, rosin resins, terpene resins, coumarone resins, xylene resins, ketone resins, and the like can be used.

As the photocurable resins, ultraviolet-curable resins comprising an acrylic compound as a main component, ultraviolet-curable resins comprising a urethane acrylate oligomer or a polyester urethane acrylate oligomer as a main component, epoxy-based resins, vinyl phenolic resins, and the like can be used.

As the solvents, one or a mixture of two or more of the solvents illustrated in the production can be used.

As the coupling agents, silane coupling agents, such as silane compounds represented by general formula $XSiY_3$ (wherein X represents a non-hydrolyzable organic group, such as a vinyl group, a methacryloxypropyl group, an aminoalkyl group, a mercaptoalkyl group, or an epoxyalkyl group, and Y represents a halogen or a hydrolyzable organic group, such as an alkoxy group), for example, γ-glycidoxypropyltrimethoxysilane and α-aminopropyltriethoxysilane, and titanium coupling agents in which Si in the above general formula is replaced by Ti can be used.

As the fillers, silica powders, such as fused silica and crystalline silica, and inorganic fillers, such as alumina, magnesium oxide (magnesia), wollastonite, mica, calcium carbonate, talc, and glass, are preferably blended. These fillers can be used as powdery, particulate, flaky, or fibrous fillers as they are, or these fillers surface-treated with the above coupling agents can be used. Further, chopped strands of organic fibers, such as Tetron, vinylon, and aromatic polyamides, can also be used.

As the flame retardants, publicly known inorganic or organic flame retardants, for example, aluminum hydroxide, antimony oxide, perchloropentacyclodecane, tetrabromobisphenol A, pentabromophenol methacrylate, halogenated epoxy resins, 4-bromophenylmaleimide, 2,4-dibromophenylmaleimide, 2,4,6-tribromophenylmaleimide, and oligomers of these bromophenylmaleimides, can be used.

As the plasticizers, for example, phthalates, such as dibutyl phthalate and dioctyl phthalate; phosphates, such as tricresyl phosphate and diphenyloctyl phosphate; dibasic acid esters, such as dibutyl sebacate, dioctyl sebacate, and di-2-ethylhexyl adipate, are used.

As the polymerization inhibitors, phenols, such as 2,6-di-t-butyl-4-hydroxytoluene, 2,6-di-t-butyl-4-methylphenol, 2,2'-methylenebis(4-methyl-6-t-butylphenol), 4,4'-butylidenebis(3-methyl-6-t-butylphenol), 4,4'-thiobis(3-methyl-6-t-butylphenol), 3,9-bis[2-(3-(3-t-butyl-4-hydroxy-5-methylphenyl)-propionyloxy)-1,1-dimethylethyl]-2,4,8,10-tetraoxaspiro(5,5)undecane, triethylene glycol-bis-3-(3-t-butyl-4-hydroxy-5-methylphenyl)propionate, n-octadecyl-3-(3,5-di-t-butyl-4-hydroxyphenyl)propionate, i-octatyl-3-(3,5-di-t-butyl-4-hydroxyphenyl)propionate, hexamethylenebis[3-(3,5-di-t-butyl-4-hydroxyphenyl)propionate], 4,6-bis(octylthiomethyl)-o-cresol, 4,6-bis(dodecylthiomethyl)-o-cresol, pentaerythritol tetrakis[3-(3,5-di-t-butyl-4-hydroxyphenyl)propionate], tris(3,5-di-t-butylhydroxybenzyl)isocyanurate, tris(4-t-butyl-2,6-dimethyl-5-hydroxybenzyl)isocyanurate, 2,6-di-t-butyl-4-(4,6-bis(octylthio)-1,3,5-triazin-2-ylamino)phenol, thiodiethylenebis[3-(3,5-di-t-butyl-4-hydroxyphenyl)propionate], N,N'-hexane-1,6-diylbis[3-(3,5-di-t-butyl-4-hydroxyphenyl)propionamide], 3,3',3",5,5',5"-hexa-t-butyl-a,a',a",-(mesitylene-2,4,6-triyl)tri-p-cresol, and calcium diethylenebis[[[3,5-bis(1,1-dimethylethyl)-4-hydroxyphenyl]methyl]phosphonate]; alkylphenols, such as 4,4'-thiobis(6-t-butyl-3-methylphenol), 3,5-di-t-butylhydroxytoluene, 2,2'-methylenebis(4-methyl-6-t-butylphenol), and 4,4'-butylidenebis(6-t-butyl-3-cresol); allylamines, such as phenyl-C-naphthylamine and N,N'-di-β-naphthyl-p-phenylenediamine; catechols, such as p-t-butylcatechol; hydroquinones, such as hydroquinone and hydroquinone monomethyl ether; nitro compounds, such as dinitrobenzene, trinitrotoluene, and picric acid; oximes, such as quinone dioxime and cyclohexanone oxime; phenothiazine; organic or inorganic copper salts, and the like are used.

The organopolysiloxanes comprise a dimethylsiloxane unit as the basic repeating unit, have at a terminal and/or a side chain in the molecule at least one functional group selected from a carboxyl group, a hydroxyl group, an amino group, an ester group, a mercapto group, an epoxy group, a polyoxyalkylene group, a vinyl group, and a (meth)acrylic group, and have a number average molecular weight of 1,000 or more, and can further have a structure in which part of methyl groups in the repeating unit are substituted by an alkyl group, a cycloalkyl group, an aryl group, or an aralkyl group having 2 to 20 carbon atoms. For commercial products, as those having a carboxyl group, SF-8418 and BY-16-750 (manufactured by Dow Corning Toray Silicone Co., Ltd.), and XF42-411 (manufactured by Toshiba Silicones) are illustrated. As those having a hydroxyl group, SF-8427, SF-8428, SH-3771, BX16-190, and BY16-752 (manufactured by Dow Corning Toray Silicone Co., Ltd.), and XF42-220 and XF42-414 (manufactured by Toshiba Silicones) are illustrated. As those having an amino group, SF-8417, BX16-859, and BY16-853 (manufactured by Dow Corning Toray Silicone Co., Ltd.), and TSF4700, TSF4701, and TSF4702 (manufactured by Toshiba Silicones) are illustrated. As those having an ester group, SF-8422 (manufactured by Dow Corning Toray Silicone Co., Ltd.) is illustrated. As those having a mercapto group, BX16-838A (manufactured by Dow Corning Toray Silicone Co., Ltd.) is illustrated. As those having an epoxy group, SF8411, SF8413, BY16-861, and BY16-855 (manufactured by Dow Corning Toray Silicone Co., Ltd.), and TSF-4730 and YF3965 (manufactured by Toshiba Silicones) are illustrated. As those having a polyoxyalkylene group, SH3749, SH8400, and SF8419 (manufactured by Dow Corning Toray Silicone Co., Ltd.), and TSF4440, TSF4445, and TSF4450 (manufactured by Toshiba Silicones) are illustrated. As those having an epoxy group and a polyoxyalkylene group, SF8421EG, BY16-845, and BX16-866 (manufactured by Dow Corning Toray Silicone Co., Ltd.) are illustrated. As those having a vinyl group, BX16-867 (manufactured by Dow Corning Toray Silicone Co., Ltd.) is illustrated. As those having a (meth)acrylic group, BX16-192 (manufactured by Dow Corning Toray Silicone Co., Ltd.) is illustrated. These are used singly or as a mixture of two or more.

As the pigments, any of acidic pigments, neutral pigments, and basic pigments can be used. For example, as the acidic pigments, barium sulfate can be used. As the neutral pigments, titanium oxide, zinc oxide, amorphous silica, clay, kaolin, calcined kaolin, talc, satin white, plastic pigments, and the like can be used. As the basic pigments, calcium carbonate, aluminum hydroxide, barium carbonate, magnesium hydroxide, and the like can be used.

For the fibrous base materials, as inorganic fibers, various glass fibers, such as E glass, C glass, A glass, S glass, and D glass consisting of $SiO_2$, $Al_2O_3$, and the like, and Q glass consisting of quartz, carbon fibers, asbestos fibers, and the like can be used. As organic fibers, polyester fibers, polyacrylic fibers, aromatic polyamide fibers, and the like can be used.

As the antistatic agents, quaternary ammonium salts, pyridinium salts, various cationic compounds having a cationic group, such as a primary to tertiary amino group, anionic compounds having an anionic group, such as a sulfonate group, a sulfate group, a phosphate group, or a phosphonate group, amphoteric compounds, such as an amino acid type and an aminosulfate type, nonionic compounds, such as an amino alcohol type, a glycerin type, and a polyethylene glycol type, organometallic compounds such as alkoxides of tin and titanium, and metal chelate compounds such as acetylacetonate salts thereof, and the like can be used, and high molecular weight compounds of the compounds listed above can be further used. In addition, polymerizable compounds, such as organometallic compounds such as coupling agents having a tertiary amino group, a quaternary ammonium group, or a metal chelate moiety, and having a monomer or oligomer that can be polymerized by ionizing radiation, or a polymerizable functional group that can be polymerized by ionizing radiation, can also be used as the antistatic agents.

The curable composition and the cured product thereof according to the present invention can be used for photosensitive polymer printing plates, sealing materials, caulks, encapsulating agents, road marking paints, photoresists, binders, impact resistance-improving agents, polymer modifiers, oxygen or water vapor barrier coatings, insulating protective coatings, semiconductor sealing materials, solar cell sealing materials, LED sealing materials, LCD sealing materials, organic EL sealing materials, solder resists, pigment dispersions, stereolithography, laminated resins, graft copolymers, composite materials, optical fiber coatings, paper coatings, metal coatings, glass coatings, plastic coatings, wood coatings, waterproof materials, electrical insulating materials, automobile belts or hoses, tires, engine mounts, gaskets, golf ball cores, rubber rolls, and the like by selecting the molecular weight, degree of curing, and the like of the terminal-modified polybutadiene or terminal-modified hydrogenated polybutadiene used, and appropriately selecting other blended components, according to the purpose.

When the polymer is terminal-modified hydrogenated polybutadiene, the cured product of the present invention does not yellow, has improved transmittance, and is an optimal material for an optical material.

EXAMPLES

Next, the present invention will be described in more detail by Examples, but the present invention is not limited to the following Examples. "Parts" represents parts by weight.

(Production of Terminal-Modified Hydrogenated Polybutadiene Composition (Hereinafter Simply Referred to as "Composition"))

Example 1 (Production of Composition A-1)

Air in a reaction flask was replaced by sufficiently dry air. A dropping funnel containing 30.2 g of hydroxyethyl acrylate, a cooling tube, and a thermometer were attached to the reaction flask, and then, 63.4 g of isophorone diisocyanate was added to the reaction flask, and the dropping of the hydroxyethyl acrylate was started at an internal temperature of 27.5° C. After 0.5 hours, the dropping was completed, and the mixture was stirred at an internal temperature in the range of 60° C. to 80° C. for 2 hours. The obtained compound is hereinafter abbreviated as HA-1.

Air in a reaction flask was replaced by sufficiently dry air. A cooling tube and a thermometer were attached to the reaction flask. 200.0 g of an alcohol-terminated hydrogenated polybutadiene (GI-1000: manufactured by Nippon Soda Co., Ltd.), 1.48 g of Alumichelate M (manufactured by Kawaken Fine Chemicals Co., Ltd.), and 0.13 g of bis-2,6-t-butyl-4-hydroxytoluene (hereinafter abbreviated as BHT) were added to the reaction flask and stirred, and then, 66.4 g of HA-1 was added at room temperature. The mixture was heated to an internal temperature of 60° C. to 80° C. and reacted for 2 hours to obtain a terminal-modified hydrogenated polybutadiene. The composition of the terminal-modified hydrogenated polybutadiene and the catalyst obtained, after the reaction, is a composition A-1.

Example 2 (Production of Composition B-1)

Operation was performed as in Example 1 except that 2.6 g of zinc neodecanoate (manufactured by ABCR) was used instead of Alumichelate M (manufactured by Kawaken Fine Chemicals Co., Ltd.), to obtain a composition B-1.

Comparative Example 1 (Production of Composition C-1)

Operation was performed as in Example 1 except that 2.6 g of zinc naphthenate (manufactured by SOEKAWA CHEMICAL CO., LTD.) was used instead of Alumichelate M (manufactured by Kawaken Fine Chemicals Co., Ltd.), to obtain a composition C-1.

Comparative Example 2 (Production of Composition D-1)

Operation was performed as in Example 1 except that 4.0 g of zinc naphthenate (manufactured by SOEKAWA CHEMICAL CO., LTD.) was used instead of Alumichelate M (manufactured by Kawaken Fine Chemicals Co., Ltd.), to obtain a composition D-1.

Comparative Example 3 (Production of Composition E-1)

Operation was performed as in Example 1 except that 0.16 g of dioctyl tin dilaurate (manufactured by Nitto Kasei Co., Ltd.) was used instead of Alumichelate M (manufactured by Kawaken Fine Chemicals Co., Ltd.), to obtain a composition E-1.

Comparative Example 4 (Production of Composition F-1)

Operation was performed as in Example 1 except that 0.22 g of dioctyl tin dilaurate (manufactured by Nitto Kasei Co., Ltd.) was used instead of Alumichelate M (manufactured by Kawaken Fine Chemicals Co., Ltd.), to obtain a composition F-1.

Example 3 (Production of Composition A-2)

Air in a reaction flask was replaced by sufficiently dry air. A dropping funnel containing 139.7 g of hydroxyethyl acrylate, a cooling tube, and a thermometer were attached to the reaction flask, and then, 220.01 g of tolylene diisocyanate (a mixture of 2-methyl-1,3-benzene diisocyanate and 4-methyl-1,3-benzene diisocyanate) was added to the reaction flask, and the dropping of the hydroxyethyl acrylate was started under a dry air flow at an internal temperature of 31.4° C. After 1.5 hours, the dropping was completed, and the mixture was stirred at an internal temperature in the range of 60° C. to 80° C. for 1 hour. The obtained compound is hereinafter abbreviated as HA-2.

Air in a reaction flask was replaced by sufficiently dry air. A cooling tube and a thermometer were attached to the reaction flask. 170.0 g of an alcohol-terminated hydrogenated polybutadiene (GI-1000: manufactured by Nippon Soda Co., Ltd.), 0.84 g of Alumichelate M (manufactured by Kawaken Fine Chemicals Co., Ltd.), and 0.12 g of bis-2,6-t-butyl-4-hydroxytoluene (hereinafter abbreviated as BHT) were added to the reaction flask and stirred, and then, 46.8 g of HA-2 was added at room temperature. The mixture was heated to an internal temperature of 60° C. to 80° C. and reacted for 2 hours to obtain a terminal-modified hydrogenated polybutadiene. The composition of the terminal-modified hydrogenated polybutadiene and the catalyst obtained, after the reaction, is a composition A-2.

Example 4 (Production of Composition B-2)

Operation was performed as in Example 3 except that 1.8 g of zinc neodecanoate (manufactured by ABCR) was used instead of Alumichelate M (manufactured by Kawaken Fine Chemicals Co., Ltd.), to obtain a composition B-2.

Comparative Example 5 (Production of Composition C-2)

Operation was performed as in Example 3 except that 0.95 g of barium neodecanoate (manufactured by ABCR) was used instead of Alumichelate M (manufactured by Kawaken Fine Chemicals Co., Ltd.), to obtain a composition C-2.

Comparative Example 6 (Production of Composition D-2)

Operation was performed as in Example 3 except that 0.42 g of n-butyl phosphate titanium (manufactured by Nippon Soda Co., Ltd.) was used instead of Alumichelate M (manufactured by Kawaken Fine Chemicals Co., Ltd.), to obtain a composition D-2.

Comparative Example 7 (Production of Composition E-2)

Operation was performed as in Example 3 except that 0.84 g of n-butyl phosphate titanium (manufactured by Nippon. Soda Co., Ltd.) was used instead of Alumichelate M (manufactured by Kawaken Fine Chemicals Co., Ltd.), to obtain a composition E-2.

Comparative Example 8 (Production of Composition F-2)

Operation was performed as in Example 3 except that 0.19 g of dibutyl tin dilaurate (manufactured by Nitto Kasei Co., Ltd.) was used instead of Alumichelate M (manufactured by Kawaken Fine Chemicals Co., Ltd.), to obtain a composition F-2.

(Appearance Test)

155 g or more of each of the compositions A-1 to F-1 and the compositions A-2 to F-2 was placed in a 200 mL sample bottle and defoamed. The appearance was evaluated in terms of white turbidity (turbidity), transparency, and coloration. The results are shown in Table 1.

(Viscosity Measurement)

The viscosity of the compositions A-1 to F-1 and the compositions A-2 to F-2 was measured at 45° C. using an E-type viscometer (TVE-22 manufactured by TOKI SANGYO CO., LTD.). The results are shown in Table 2.

TABLE 2

| Composition | Catalyst | Diisocyanate | Amount of catalyst added (parts) | Reaction time (hr) | Appearance test | Viscosity (P), E-type, 45° C. |
|---|---|---|---|---|---|---|
| A-1 | Alumichelate M | Isophorone diisocyanate | 0.74 | 2 | Colorless and transparent | 2510 |
| B-1 | Zinc neodecanoate | | 1.00 | 5 | Colorless and transparent | 2554 |
| C-1 | Zinc naphthenate | | 1.00 | 4 | Light yellow and transparent | 2510 |
| D-1 | Zinc naphthenate | | 1.51 | 3 | Light yellow and transparent | 2475 |
| E-1 | Dioctyl tin dilaurate | | 0.08 | 2 | Colorless and transparent | 2213 |
| F-1 | Dioctyl tin dilaurate | | 0.11 | 2 | Colorless and transparent | 2214 |
| A-2 | Alumichelate M | Tolylene diisocyanate | 0.39 | 2 | Colorless and transparent | 2556 |
| B-2 | Zinc neodecanoate | | 0.81 | 2 | Colorless and transparent | 2373 |
| C-2 | Barium neodecanoate | | 0.44 | 3 | White and turbid | 2392 |
| D-2 | n-Butyl phosphate titanium | | 0.20 | 3 | Yellow and transparent | 2431 |
| E-2 | n-Butyl phosphate titanium | | 0.40 | 2 | Yellow and transparent | 2597 |
| F-2 | Dibutyl tin dilaurate | | 0.10 | 2 | Colorless and transparent | 2751 |

(Storage Stability Test)

Figure 1:
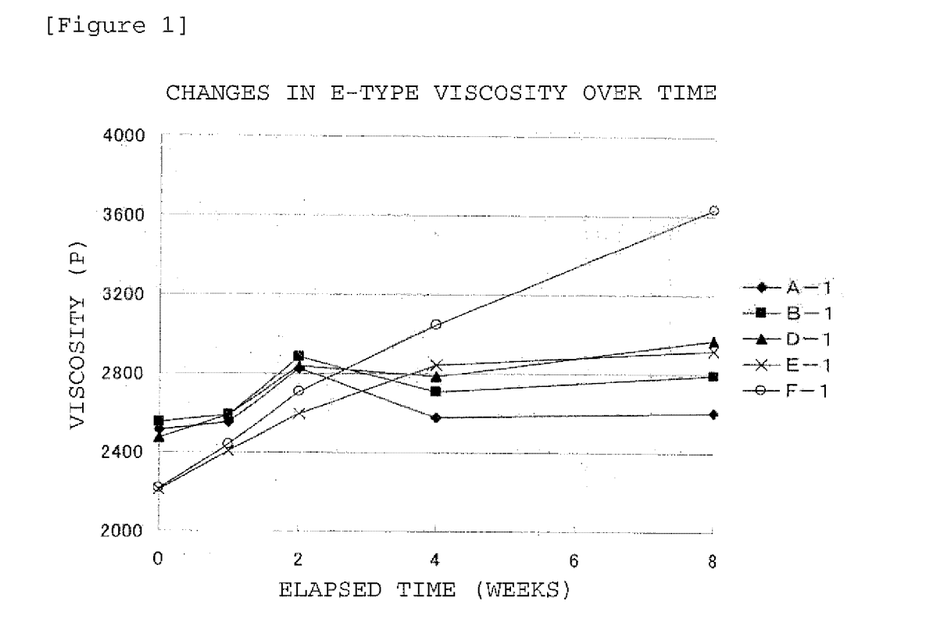
FIG. 1 is a diagram showing changes in E-type viscosity over time from immediately after production to after eight weeks for compositions A-1, B-1, D-1, E-1, and F-1.
Figure 2:
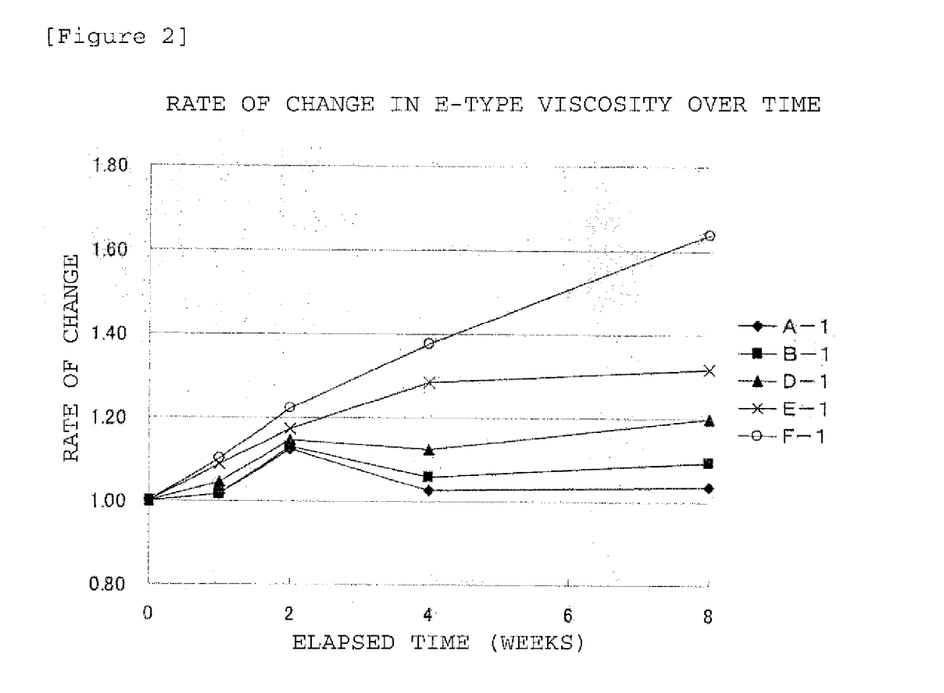
FIG. 2 is a diagram showing the rate of change in E-type viscosity over time from immediately after production to after eight weeks for the compositions A-1, B-1, D-1, E-1, and F-1.

10 to 30 g of each of the compositions A-1, B-1, D-1, E-1, and F-1 was placed in a sample bottle, and stored in an oven at 80° C. Each sample was removed and the viscosity was measured after one, two, four, and eight weeks. The measurement results of E-type viscosity are shown in FIG. 1, and the rate of change over time is shown in FIG. 2.

Figure 3:
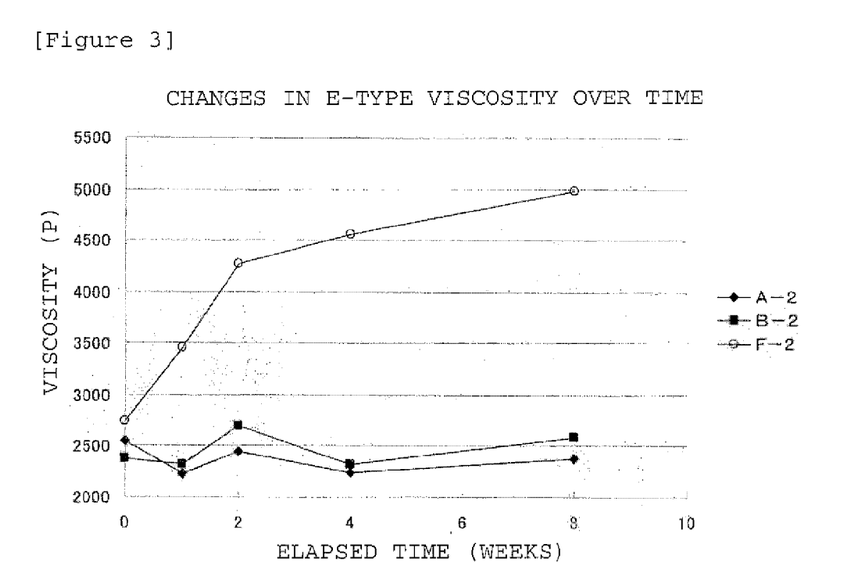
FIG. 3 is a diagram showing changes in E-type viscosity over time from immediately after production to after eight weeks for compositions A-2, B-2, and F-2.
Figure 4:
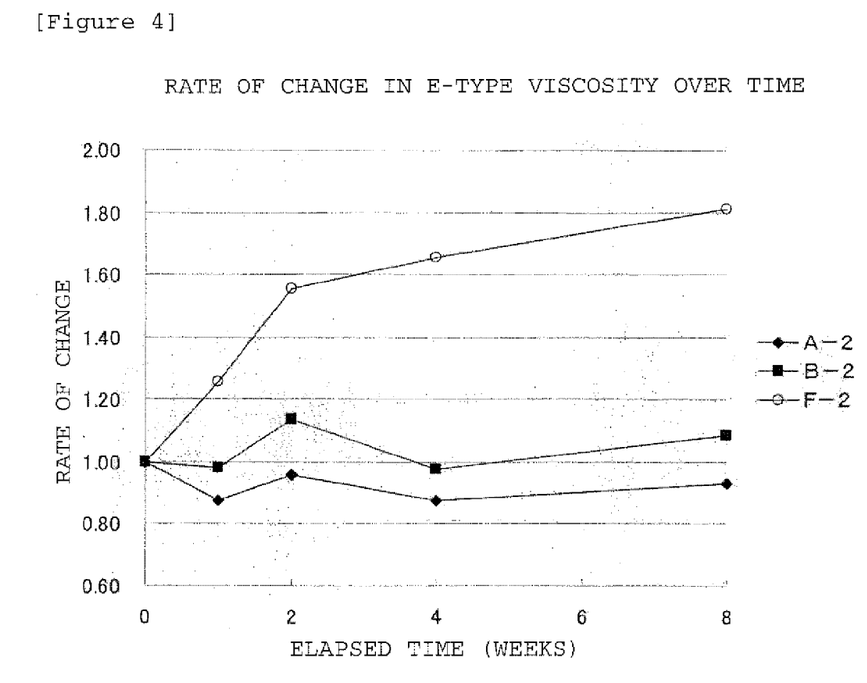
FIG. 4 is a diagram showing the rate of change in E-type viscosity over time from immediately after production to after eight weeks for the compositions A-2, B-2, and F-2.

10 to 30 g of each of the compositions A-2, B-2, and F-2 was placed in a sample bottle, and stored in an oven at 80° C. Each sample was removed and the viscosity was measured after one, two, four, and eight weeks. The measurement results of E-type viscosity are shown in FIG. 3, and the rate of change over time is shown in FIG. 4.

The invention claimed is:

1. A method for producing a terminal-modified polybutadiene or terminal-modified hydrogenated polybutadiene having a number average molecular weight of 500 to 10,000 represented by formula (IV):

(IV)

where:
R$^1$ is a hydrogen atom or a methyl group,
R$^2$ is a C1 to C10 alkylene group having a straight chain or a branched chain, a C3 to C8 cycloalkylene group optionally having a C1 to C6 alkyl group as a substituent, or a combined group thereof,
R$^3$ is:
a C1 to C10 alkylene group having a straight chain or a branched chain;
a C3 to C8 cycloalkylene group optionally having a C1 to C6 alkyl group as a substituent;
an arylene group optionally having a halogen atom, a C1 to C6 alkyl group, or a C1 to C6 alkoxy group as a substituent;
a heteroarylene group optionally having a halogen atom, a C1 to C6 alkyl group, or a C1 to C6 alkoxy group as a substituent; or
a combined group thereof,
m is 1 or 2, and
PB is a polymer chain obtained by polymerizing butadiene, or a polymer chain obtained by hydrogenating the polymer chain, the method comprising reacting together:
an isocyanate compound represented by formula (V):

(V)

where R$^1$, R$^2$, and R$^3$ are as described above, and
a polybutadiene or hydrogenated polybutadiene having a hydroxyl group at a polymer terminal, represented by formula (III):

(III)

where PB and m are as described above,
in the presence of an organoaluminum compound represented by formula (VI):

(VI)

where $R^{11}$, $R^{12}$, $R^{13}$, and $R^{14}$ each independently represents a C1 to C30 alkyl group having a straight chain or a branched chain.

2. The method according to claim 1, wherein the reaction is performed without a solvent.

* * * * *